July 5, 1960 J. W. GOSS 2,943,831
BRACKET FOR HANGING PICTURES AND THE LIKE
Filed May 5, 1958 2 Sheets-Sheet 2

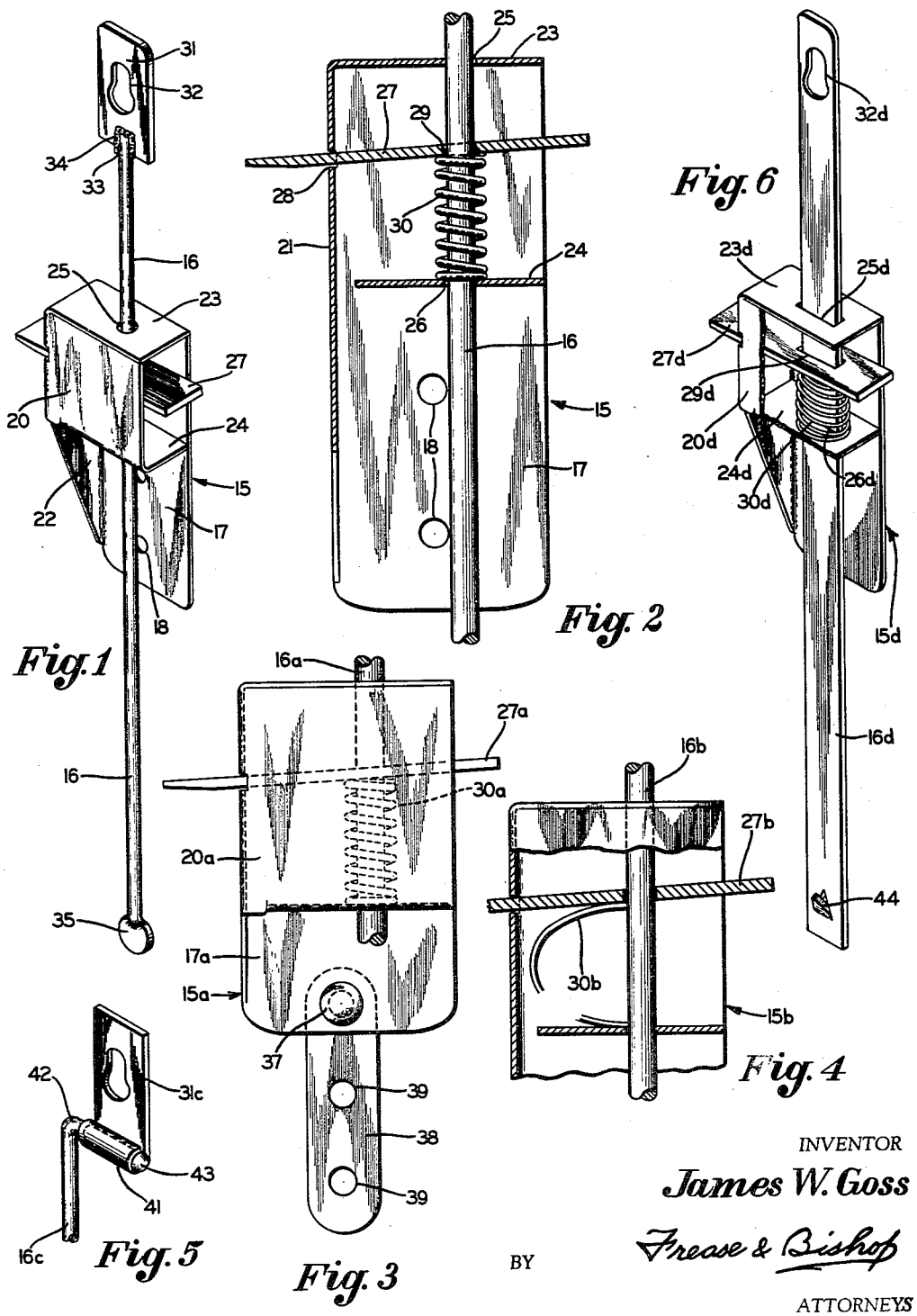

INVENTOR
James W. Goss
BY Frease & Bishop
ATTORNEYS

United States Patent Office 2,943,831
Patented July 5, 1960

2,943,831

BRACKET FOR HANGING PICTURES AND THE LIKE

James W. Goss, 410 South St. SW., Warren, Ohio

Filed May 5, 1958, Ser. No. 732,850

5 Claims. (Cl. 248—31)

The invention relates to brackets for hanging pictures, mirrors, shadow boxes and similar objects upon walls, and more particularly to such a hanger by means of which a picture or similar object may be easily and readily hung in desired position.

An object of the invention is to provide a bracket for attachment to the back of a picture frame or the like and having a rod-like member slidably connected thereto.

Another object of the invention is to provide such a bracket with means for frictionally locking the rod-like member in adjusted position.

A further object of the invention is to provide a spring-loaded locking lever on the bracket for holding the rod-like member in adjusted position.

A still further object of the invention is to provide a key-hole slotted member at the upper end of the rod-like member for attachment to a screw, nail or similar fastening means.

It is also an object of the invention to provide a hinge joint between the rod-like member and the key-hole slotted member.

Another object of the invention is to provide a pivotal connection between the bracket and a picture frame or similar object.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms, the invention may be described as comprising a bracket with means for attaching the same to the back of a picture frame or the like. The bracket has a housing formed thereon through which a rod-like member is vertically slidable. A spring-loaded locking lever is located in the housing of the bracket for frictionally holding the rod-like member in adjusted position.

A flat member with a key-hole slot therein is connected to the upper end of the rod-like member for engagement with a screw, nail or other fastening means in a wall. The key-hole slotted member may be rigidly connected to the upper end of the rod-like member or may be hingedly connected thereto.

The rod-like member has a shoulder or projection upon its lower end to limit upward movement thereof relative to the bracket. The bracket may be rigidly connected to the back of a picture frame or other object to be hung by screws or the like for rigidly connecting the bracket, or means may be provided for pivotally mounting the bracket upon the back of the picture frame.

The rod-like member may be in the form of a round rod or may be a flat strip of metal or the like. The device is so constructed that the rod-like member may normally be slidably moved downward relative to the bracket, but is normally held against upward movement relative thereto.

Having thus briefly described the invention, reference is now made to the embodiments thereof illustrated in the drawings, in which:

Fig. 1 is a detached perspective view of a picture hanging bracket embodying the invention;

Fig. 2 is an enlarged fragmentary sectional view showing the spring-loaded lever for frictionally holding the rod-like member against movement relative to the bracket per se;

Fig. 3 is an enlarged fragmentary elevation of a modified form of the device showing means for partially attaching the bracket per se to the back of a picture frame or the like;

Fig. 4 is an enlarged fragmentary sectional view showing a modified form of the invention, in which a leaf spring is provided for loading the locking lever;

Fig. 5 is a fragmentary perspective view of the upper end portion of a rod-like member with the key-hole slotted member hingedly connected thereto;

Fig. 6 is a detached perspective view with parts broken away showing the picture hanging bracket provided with a flat rod-like member;

Referring now more particularly to the embodiment illustrated in Figs. 1, 2, 7 and 8, the improved picture hanging bracket comprises the bracket per se indicated generally at 15 and the rod-like member 16.

Figure 7:
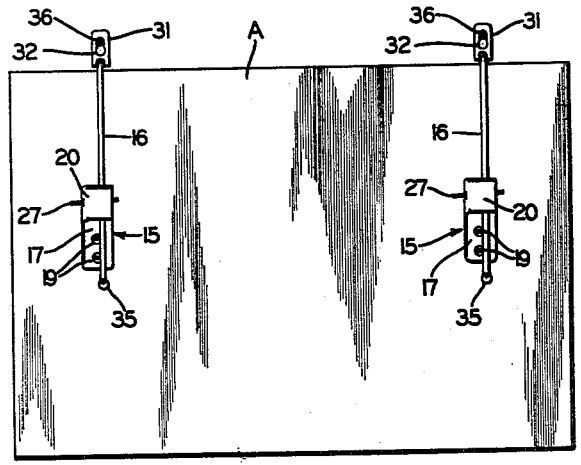
Fig. 7 is a rear elevation of a mirror or the like showing the manner of attaching the improved brackets to the rear surface thereof for hanging the mirror.

The bracket per se comprises a back plate 17 which may be provided with apertures 18 for attaching the same to the back of a picture frame, mirror or the like by screws 19 or the like, as shown in Fig. 7.

A housing 20 is formed upon the upper portion of the bracket and comprises one side wall 21, the lower end of which terminates in the tapered rib 22, a top wall 23 and bottom wall 24.

The rod-like member 16, which, as shown in these views, is of round cross section, is slidably located through the openings 25 and 26 in the top wall 23 and bottom wall 24 respectively, said openings being of slightly larger diameter than the rod 16.

A locking lever 27 is fulcrumed through an opening 28 in the side wall 21 of the housing and has an opening 29 therein of slightly larger diameter than the rod 16, through which opening the rod is located as best shown in Fig. 2.

A coil spring 30 is located around the rod 16 between the bottom wall 24 of the housing and the locking lever 27. As shown in Fig. 2 the spring 30 holds the right hand end portion of the lever 27 tilted upward frictionally engaging the upper right hand edge and the lower left hand edge of the opening 29 against the rod 16. This locks the rod 16 against upward movement relative to the bracket while permitting the rod to be moved downward relative to the bracket.

A flat member 31, provided with a key-hole slot 32, is attached to the upper end of the rod 16. As best shown in Fig. 1, the upper end of the rod may be rigidly attached to the flat member 31 by locating the end of the rod within a notch 33 in the lower edge of the member 31 and welding as indicated at 34.

In order to prevent the rod from being moved upward out of the bracket, a suitable shoulder or projection is formed upon the lower end of the rod, as by flattening the same as indicated at 35.

The improved picture hanging bracket may be easily and readily attached to the back of a picture frame, mirror or other object to be hung and the picture or other object may be easily hung from nails or screws located in properly spaced positions in a wall, and adjusted relative thereto so as to conceal the brackets, rods and nails or other attaching means.

As shown in Fig. 7, two of the brackets may be attached to the back of a mirror or the like, as indicated at A, at points near the side edges thereof, by means of screws 19 or the like. The rods 16 are adjusted relative to the brackets 15 so that the key-hole slotted members 31 will be located above the top of the mirror or picture frame as shown in Fig. 7.

The picture or other object may thus be easily hung by engaging the key-hole slots 32, at the upper ends of the rod members, with nails, screws or the like as indicated at 36, which have been attached to the wall at proper locations to receive the key-hole slots.

Figures 8, 12:
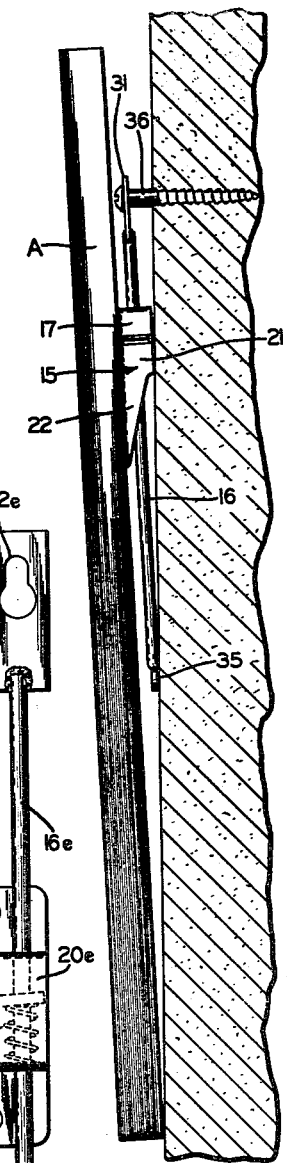
Fig. 8 is an enlarged side elevation of the device shown in Fig. 7 showing the position to which the rod-like member is adjusted for concealing the same in the rear of the mirror or picture.
Fig. 12 is an elevation of another modification.

After the picture or mirror is hung, it may then be moved upward, sliding the brackets upon the rods 16 to the desired position as shown in Fig. 8, in which the brackets, rods and screws or nails 36 are concealed behind the mirror or picture.

It will be seen that all work is thus done in the open. The picture or other object is easily and readily hung upon the wall, as the key-hole slots at the upper ends of the rods are located above the top of the picture or mirror frame and thus clearly visible from the front so that they may be easily engaged with the screws or nails in the wall. And after the picture is hung, it is adjusted to conceal the brackets, rods and nails or screws.

The picture or other object thus hung will be held in adjusted position, as the spring-loaded lever 27 frictionally engaging the rods 16 in the manner above described will prevent downward movement of the brackets and the object carried thereby, relative to the rods.

Figure 9:
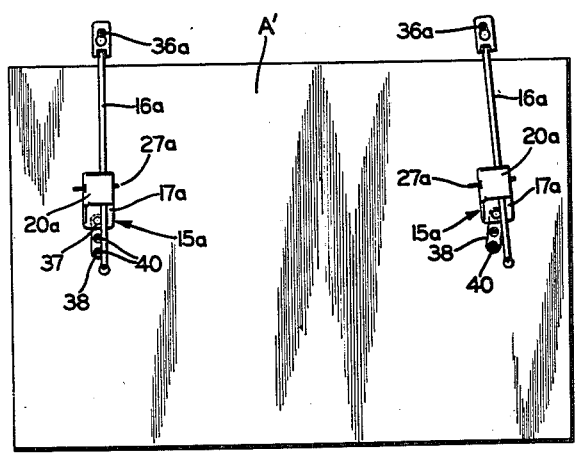
Fig. 9 is a view similar to Fig. 7, showing the type of bracket illustrated in Fig. 3.

In Figs. 3 and 9 is shown a slightly modified form of the invention in which the bracket is so constructed that it may be pivotally attached to the back of a picture frame, mirror or the like.

In this form of the invention, the bracket per se 15a is substantially the same as in Figs. 1 and 2, with the exception that the back plate 17a is considerably shorter than as shown in Figs. 1 and 2. The housing 20a, rods 16a, locking lever 27a and spring 30a may all be of the same construction as shown in Figs. 1 and 2 and above described.

Instead of attaching the back plate 17a rigidly to the picture or mirror frame, the same is pivotally attached, as indicated at 37, to an attaching plate 38 provided with suitable apertures 39 through which screws or the like, as indicated at 40, may be located to attach the same to the rear of a picture frame or mirror as indicated at A' in Fig. 9.

The pivotal joints 37 permit radial adjustment of the brackets and rods to compensate for any error in the location of the supporting nails or screws 36a in the walls, as indicated by the position of the right hand bracket in Fig. 9.

As shown in Fig. 4, a leaf spring 30b may be substituted for the coil spring of Figs. 2 and 3 for loading the locking lever 27b in order to frictionally engage the rod 16b. The bracket per se 15b in this form of the invention may be either as shown in Figs. 1 and 2 or as in Fig. 3.

As shown in Fig. 5, the key-hole slotted member 31c may be hingedly connected to the upper end of the rod member 16c instead of rigidly attached thereto as in Fig. 1. For this purpose, a tubular hinge knuckle 41 may be formed upon the lower end of the slotted member 31c, and the upper end of the rod member 16c may be angularly bent as at 42 and rotatably located within said hinge knuckle, a head 43 being formed upon the free end thereof to prevent accidental displacement of the parts.

The rod member may be in the form of a flat metal strip 16d, as shown in Fig. 6, instead of a round rod as above described. A key-hole slot 32d may be formed in the upper end of the strip 16c for engaging over a nail, screw or the like in the wall, and any suitable projection or enlargement, such as the punched-out tongue 44, may be formed upon the lower end portion of the strip 16d to limit upward movement of the strip relative to the bracket per se.

The bracket per se is indicated generally at 15d in Fig. 6 and may be of the same construction as shown and above described with the exception that elongated slots 25d, 26d and 29d are formed in the top and bottom walls 23d and 24d respectively of the housing 20d and in the lever 27d, through which slots the flat strip 16d is slidably located. The spring 30d may be a coil spring as shown in Figs. 2 and 3, or a leaf spring as shown in Fig. 4, and the operation is the same as above described.

For the purpose of hanging shadow boxes, pivoted brackets such as shown in Fig. 3 may be used, and the key-hole slotted members may be hingedly connected to the upper ends of the rod members as shown in Fig. 5.

Figures 10, 11:
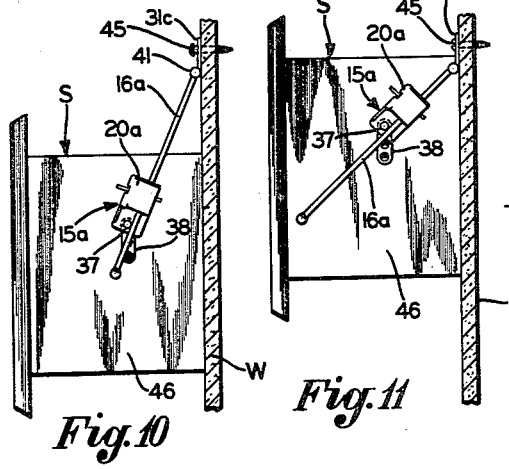
Fig. 10 is a side elevation of a shadow box showing the manner of attaching the pivoted brackets of Fig. 3 with the hinged key-hole slotted members of Fig. 5.
Fig. 11 is a similar view showing the shadow box adjusted to final position upon the wall.

In Figs. 10 and 11 is shown the manner of hanging a shadow box indicated generally at S, flush with a wall W by means of these brackets. In hanging the shadow box, screws 45 or the like are inserted into the wall at proper distances apart and at the desired height. The head of each screw should be left protruding from the wall about one-fourth inch.

The attaching plates 38 of the brackets 15a are attached to the side walls 46 of the shadow box S and the brackets may be swung backward toward the wall upon their pivots 37, so that the key-hole slotted members 31c all may be engaged over the screws 45 as shown in Fig. 10.

The screws are then tightened to lock the key-hole slotted members tightly against the wall. The shadow box S is then pushed upward, the brackets 15a sliding upward upon the rod members 16a to the position shown in Fig. 11, the back of the shadow box being flush against the wall and the shadow box being level as shown in Fig. 11, the key-hole slotted members 31c and the screws 45 being concealed by the shadow box.

In Fig. 12 is shown an embodiment of the invention in which a reversible bracket is provided for attachment to the back of a picture frame, mirror or the like adjacent to either the left or right side thereof. The bracket per se, indicated generally at 15e, is provided with a back plate 17e extending above and below the housing 20e. Apertures 18e are formed in the back plate above and below the housing, for receiving screws or the like for attaching the bracket to the picture frame or other object to be hung.

The rod 16e, which may be the same as the rods of any of the forms of the invention above described, is slidably located through the housing of the bracket in the manner above described. A member 31e is provided at the upper end of the rod and has a keyhole slot 32e therein, and an enlargement 35e is provided upon the lower end of the rod.

A locking lever is fulcrumed within the housing 20e and loaded by a spring 30e for causing the lever to frictionally lock the rod in adjusted position in the manner above described.

As shown in Fig. 12, the bracket and rod assembly are adapted for attachment to a picture frame or the like near the left hand edge thereof, the lever 27e protruding from the left side of the housing so as to be easily accessible for adjusting.

For use near the right edge of the picture frame, the bracket per se 15e would be inverted and the rod would be inserted therethrough from top to bottom, with the spring 30e surrounding the rod and located beneath the lever 27e, the free end of which would extend to the right so as to be accessible for adjusting.

When it is desirable to remove pictures, mirrors, shadow boxes or similar objects hung by the improved device, it is only necessary that the locking levers be tilted so as to release the rods. The picture or other object may thus be moved downward, sliding the brackets upon the rods until the key-hole slotted members are exposed above the top of the picture, so that they may be disengaged from the screws or nails in the wall.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A device for hanging framed pictures and the like upon a wall, said device comprising a bracket, said bracket including a back wall, means for connecting the back wall to a picture and the like, a housing mounted upon the back wall, said housing comprising a front wall, vertically spaced top and bottom walls and a side wall at one side of the housing, there being an opening in said side wall and aligned openings in said top and bottom walls, a rod member slidably located through said aligned openings, means at the upper end of the rod for attachment to a wall, a locking lever located transversely through the housing and having one end portion fulcrumed through the opening in said side wall and extending outwardly therebeyond, said locking lever having an opening therein of larger cross-sectional area than the rod, said rod being located through said opening in the locking lever, and a coil spring surrounding said rod between said bottom wall and the locking lever for normally preventing downward movement of the bracket relative to the rod member.

2. A device for hanging framed pictures and the like upon a wall, said device comprising a bracket, said bracket including a back wall means for connecting the back wall to a picture and the like, a housing mounted upon the back wall, said housing comprising a front wall, vertically spaced top and bottom walls and a side wall at one side of the housing, the opposite side of the housing being open, there being an opening in said side wall and aligned openings in said top and bottom walls, a rod member slidably located through said aligned openings, means at the upper end of the rod for attachment to a wall, a locking lever located transversely through the housing and having one end portion fulcrumed through the opening in said side wall and extending outwardly therebeyond, said locking lever having an opening therein of larger cross-sectional area than the rod, said rod being located through said opening in the locking lever, and a coil spring surrounding said rod between said bottom wall and the locking lever for normally preventing downward movement of the bracket relative to the rod member, the free end of the locking lever extending through the open side of the housing to permit manual operation thereof.

3. A device for hanging framed pictures and the like upon a wall, said device comprising a bracket, said bracket including a back wall means for connecting the back wall to a picture and the like, a housing mounted upon the back wall, said housing comprising a front wall, vertically spaced top and bottom walls and a side wall at one side of the housing, there being an opening in said side wall and aligned openings in said top and bottom walls, a rod member slidably located through said aligned openings, means at the upper end of the rod for attachment to a wall, a locking lever located transversely through the housing and having one end portion fulcrumed through the opening in said side wall and extending outwardly therebeyond, said locking lever having an opening therein of larger cross-sectional area than the rod, said rod being located through said opening in the locking lever, and a coil spring surrounding said rod between said bottom wall and the locking lever for normally preventing downward movement of the bracket relative to the rod member.

4. A device for hanging framed pictures and the like upon a wall, said device comprising a bracket said bracket including a back wall means for connecting the back wall to a picture and the like, a housing mounted upon the back wall, said housing comprising a front wall, vertically spaced top and bottom walls and a side wall at one side of the housing, there being an opening in said side wall, the opposite side of the housing being open, there being aligned openings in said top and bottom walls, a rod member slidably located through said aligned openings, means at the upper end of the rod for attachment to a wall, a locking lever located transversely through the housing and having one end portion fulcrumed through the opening in said side wall and extending outwardly therebeyond, said locking lever having an opening therein of larger cross-sectional area than the rod, said rod being located through said opening in the locking lever, and a coil spring surrounding said rod between said bottom wall and the locking lever for normally preventing downward movement of the bracket relative to the rod member, the free end of the locking lever extending through the open side of the housing to permit manual operation thereof.

5. A device for hanging framed pictures and the like upon a wall, said device comprising a bracket said bracket including a back wall, an attaching plate pivotally connected to the back wall, means for connecting the attaching plate to a picture and the like, a housing mounted upon the back wall, said housing comprising a front wall, vertically spaced top and bottom walls and a side wall at one side of the housing, there being an opening in said side wall and aligned openings in said top and bottom walls, a rod member slidably located through said aligned openings, pivotally connected means at the upper end of the rod for attachment to a wall, a locking lever located transversely through the housing and having one end portion fulcrumed through the opening in said side wall and extending outwardly therebeyond, said locking lever having an opening therein of larger cross-sectional area than the rod, said rod being located through said opening in the locking lever, and a coil spring surrounding said rod between said bottom wall and the locking lever for normally preventing downward movement of the bracket relative to the rod member.

References Cited in the file of this patent

UNITED STATES PATENTS

| | | |
|---|---|---|
| 722,311 | Magerhans | Mar. 10, 1903 |
| 801,383 | King | Oct. 10, 1905 |
| 894,817 | Copeland | Aug. 4, 1908 |
| 1,792,326 | Samard | Feb. 10, 1931 |
| 2,591,685 | Du Mais | Apr. 8, 1952 |
| 2,832,405 | Cooley | Apr. 29, 1958 |

FOREIGN PATENTS

| | | |
|---|---|---|
| 506,703 | Belgium | Nov. 14, 1951 |